UNITED STATES PATENT OFFICE.

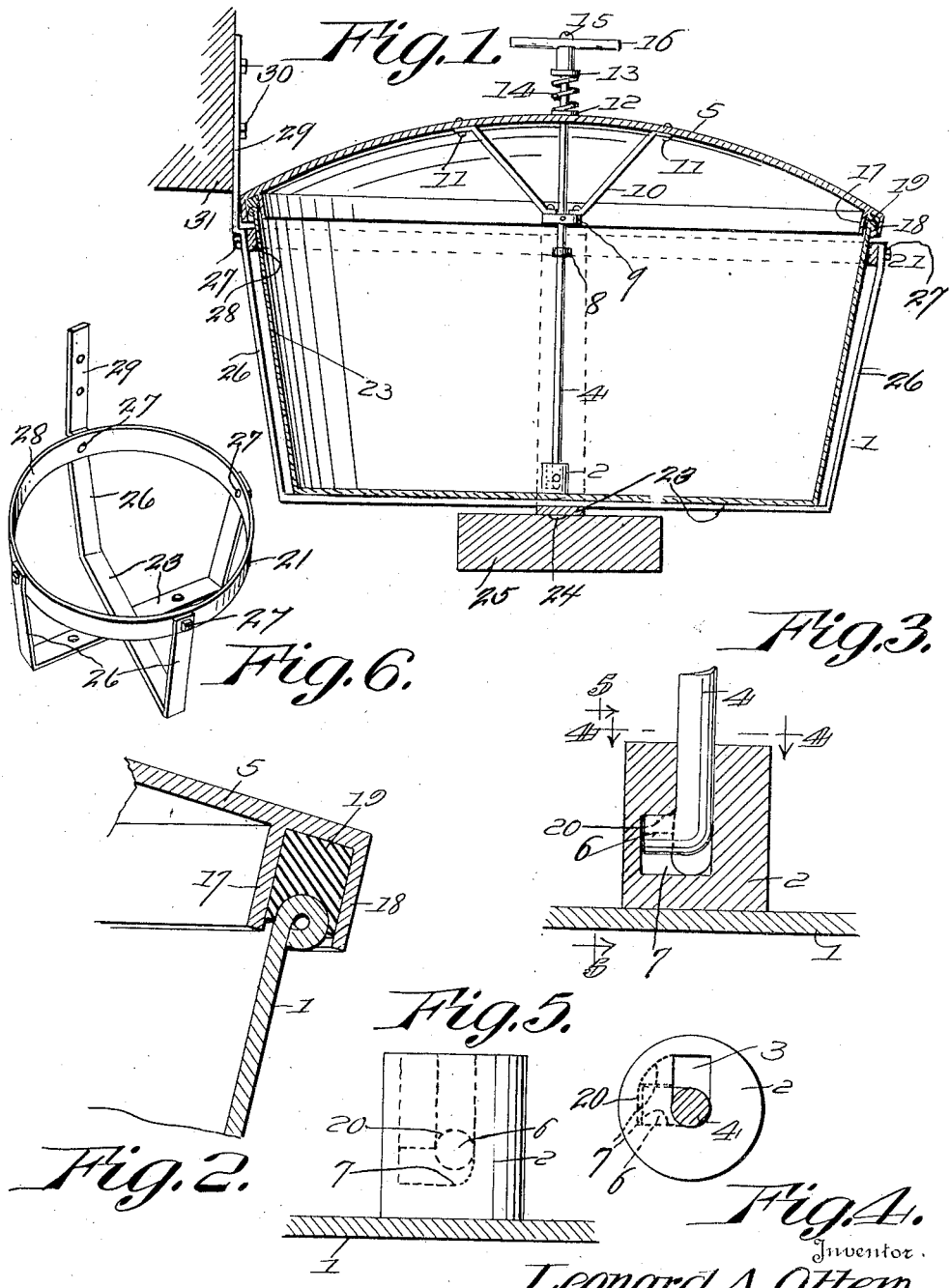

LEONARD A. OTTEM, OF OSNABROCK, NORTH DAKOTA.

WATER CONTAINER OR RECEPTACLE.

1,356,085.

Specification of Letters Patent.

Patented Oct. 19, 1920.

Application filed February 18, 1920. Serial No. 359,520.

*To all whom it may concern:*

Be it known that I, LEONARD A. OTTEM, a citizen of the United States, residing at Osnabrock, in the county of Cavalier and State of North Dakota, have invented certain new and useful Improvements in Water Containers or Receptacles, of which the following is a specification, reference being had to the accompanying drawings.

During threshing season it has become a custom to camp out in the field for dinner, and at such times it is necessary to have a sufficient supply of water. Therefore, the present invention relates to an improved, simple and efficient container or receptacle, which may be supported upon a suitable rack of the threshing apparatus, so that the water will, at all times, be convenient for use.

One of the objects of the invention is to provide a device of this kind capable of being manufactured for a relatively low cost and sold at a reasonable profit.

Another object of the invention is the provision of a receptacle or container having a cover, and means for detachably holding the cover on the receptacle or container in such wise that it may be readily and very quickly removed and applied.

A further object of the invention resides in the provision of means engaging between the cover and the marginal edge of the perimeter of the receptacle or container, to insure a tight fit between the cover and the receptacle, thereby preventing leakage of the water incident to splashing of the water as the apparatus is drawn over the field.

A still further object of the invention consists in the provision of means for exerting pressure on the cover to cause a tight fit of the packing means of the cover, to assure the prevention of leakage of the water.

The invention additionally aims to provide a supporting shaft or handle member passing centrally through the cover and being detachably connected to the bottom of the receptacle, in combination with braces between the cover and said shaft or handle rod to hold the cover relatively thereto, said shaft or rod acting as a support for the yieldable pressure means.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view, showing the container or receptacle as supported upon a rack of the threshing apparatus, Fig. 2 is an enlarged detail view of the joint between the cover and the marginal edge of the perimeter of the receptacle, and Fig. 3 is a detail view of the connection between the central shaft or handle rod and the bottom of the receptacle or container, whereby the shaft or rod is held in place.

Fig. 4 is a sectional view on line 4—4 of Fig. 3, and

Fig. 5 is a detail view in elevation of the connection between the bottom of the receptacle and the rod or shaft 4.

Fig. 6 is a detail perspective view of the frame 21.

Referring more especially to the drawings, 1 designates the receptacle or container, which may be any suitable shape or configuration, and may be made in any suitable size, so as to contain the desired quantity of water. The bottom of the receptacle has connected thereto centrally a boss 2 provided with an L-shaped cavity 3, and 4 denotes a shaft or handle rod, which carries the cover 5 of the receptacle. The lower end of this shaft or handle rod has a right angle extending lug 6. The L-shaped cavity 3 of the boss 2 is of elongated form horizontally, to permit the right angle extending lug 6 of the shaft or handle rod to enter, and the lower portion of the cavity 3 has a right angle under-cut portion 7 to receive the right angle extending lug 6 of the shaft or handle rod when a partial rotation or quarter turn is imparted to the shaft or handle rod.

The shaft or handle rod 4 has an annular collar 8. Carried by the shaft or handle rod is a movable collar 9 disposed above the collar 8, and has connected thereto at intervals a plurality of braces 10. The cover 5 receives the shaft or rod centrally, and the braces 10 are in turn connected at 11 to the cover. A washer or plate 12 of circular form is fitted upon the shaft or handle rod above the cover 5, and engaging between this plate or washer and a second plate or washer 13 is a coil spring 14. The spring 14 is in surrounding relation to the shaft or rod and bears upon the plate or washer 12, to force the cover 5 downwardly. Connected to the shaft or handle rod in any suitable manner such as indicated at 15 is a handle 16, whereby the shaft or rod may be rotated, and whereby the cover may be supported and readily handled when removed from the receptacle. Adjacent the marginal edge of the cover 5 and extending annularly is a pair of spaced circular flanges 17 and 18. The inner flange 17 engages on the inner face of the perimeter of the receptacle 1 whereas the outer flange 18 engages on the outer face of the perimeter of the receptacle. In between the flanges 17 and 18, a suitable rubber gasket or other packing 19 is interposed, and is adapted to bear down upon the marginal edge of the perimeter of the receptacle to insure a tight fit between the parts and prevent leakage. It will be noted that when the cover is in place, the spring 14 will act against the washer or plate 13 and then in turn bear against the washer or plate 12, thereby forcing the cover 5 downwardly in engagement with the perimeter of the receptacle, causing the rubber gasket to fit tightly upon the marginal edge of the perimeter thereof. This action of the spring is due to the fact that the lower end of the shaft or rod is attached to the bottom of the receptacle or container, in order to withstand the upward pressure of the spring. In fact, when the shaft or rod is given a partial rotation or quarter turn, the lateral lug will engage notch 20, in order to prevent a return quarter turn or movement of the shaft or rod. However, when it is desired to detach the cover, a downward pressure may be given the shaft or rod, to overcome the action of the spring and then a partial rotary movement or quarter turn may be imparted to the shaft or rod, then the shaft or rod will become detached as well as the cover. Reverse movements of the shaft are necessary to reconnect the cover to the receptacle.

The receptacle or container is received and supported by a suitable frame 21. The frame 21 comprises the crossing pieces 23, which are secured together as at 24 at their intersection. These crossing pieces rest upon and are supported by a portion 25 of any suitable rack of the threshing machine not shown. The crossing pieces have upstanding parts 26 which are secured at 27 to a band 28. One of the upstanding parts 26 has an extension 29, which is secured at 30 to another portion 31 of the rack, which is adapted to be carried by the threshing machine not shown.

The invention having been set forth, what is claimed as new and useful is:

1. In a device as set forth, the combination with a container, of a cover therefor, and means movably passing through the center of the cover for holding the cover on the container, said means being detachable from the bottom of the container through the medium of a depression movement and a subsequent rotation.

2. In a device as set forth, the combination with a container, of a cover therefor, and means passing through the center of the cover and connected to the bottom of the container for holding the cover in place, said means being detachable from the bottom of the container through the medium of a depression movement and a subsequent rotation, said means including a yieldable means above the cover to supply pressure on the cover to hold the same in tight fitting engagement with the container.

3. In a device as set forth, the combination with a receptacle, of a cover therefor having tight fitting engagement with the marginal edge of the perimeter of the receptacle, and a spring tensioned device passing centrally through the cover and provided with a right angle arm connected to the bottom of the receptacle for holding the cover in place, said right angle arm being detachable from the bottom through the medium of a depression movement and a subsequent rotation.

4. In a device as set forth, the combination with a water receiving receptacle provided with a boss on its bottom, of a cover having tight fitting engagement with the marginal edge of the perimeter of the receptacle, of an element passing centrally and vertically through the cover, said element being detachable from the boss through the medium of a depression movement and a subsequent rotation, means upon the element and coöperating with the cover to force it in a direction toward the receptacle to insure a tight fitting engagement of the cover with the receptacle.

5. In a device as set forth, the combination with a water receiving receptacle having a centrally disposed boss having an L-shaped cavity, the upper wall of the cavity having a recess, of a cover for the receptacle provided with a tight fitting engagement therewith, an element passing centrally through the cover and provided with a right angle extending lug at its lower end to detachably engage said L-shaped cavity of the boss, spring means on the element for bearing upon the cover and urging the element upwardly whereby said lug may engage with said recess to hold the cover in place on the receptacle, and a handle on the element.

6. In a device as set forth, the combination with a water receiving receptacle having a centrally disposed boss having an L-shaped cavity, of a cover for the receptacle provided with a tight fitting engagement therewith, an element passing centrally through the cover and provided with a right angle extending lug at its lower end to detachably engage said L-shaped cavity of the boss, spring means on the element for bearing upon the cover to insure a tight fitting engagement of the cover with the marginal edge of the perimeter of the receptacle, and a handle on the element, the upper wall of the L-shaped cavity of the boss having means to be engaged by the right angle extending lug of the element to prevent accidental detachment of the element, and braces between the cover and the element.

7. In a device as set forth, a water receiving receptacle provided on its bottom with a boss having a cavity said cavity comprising two parts, one part extending vertically, the other part extending laterally from the bottom of the vertical part, the upper wall of the lateral part having a recess, a covering having operative fitting engagement with the marginal edge of the perimeter of the receptacle, an element passing centrally and vertically through the cover and having a right angle lug at its lower end adapted to pass through the central part of the cavity, said element adapted to be rotated whereby the right angle lug may engage the lateral part of the cavity, and means on the element coöperating with the cover to impart a subsequent upward movement to the element causing said lug to engage said recess.

8. In a device as set forth, the combination with a container, of a cover therefor, and means passing through the center of the cover and being detachable from the bottom of the container through the medium of a depression movement and a subsequent rotation for holding the cover on the container, and an element carried by the means to limit said means in its movement through the cover relatively thereto.

In testimony whereof I hereunto affix my signature.

LEONARD A. OTTEM.